Patented Apr. 13, 1954

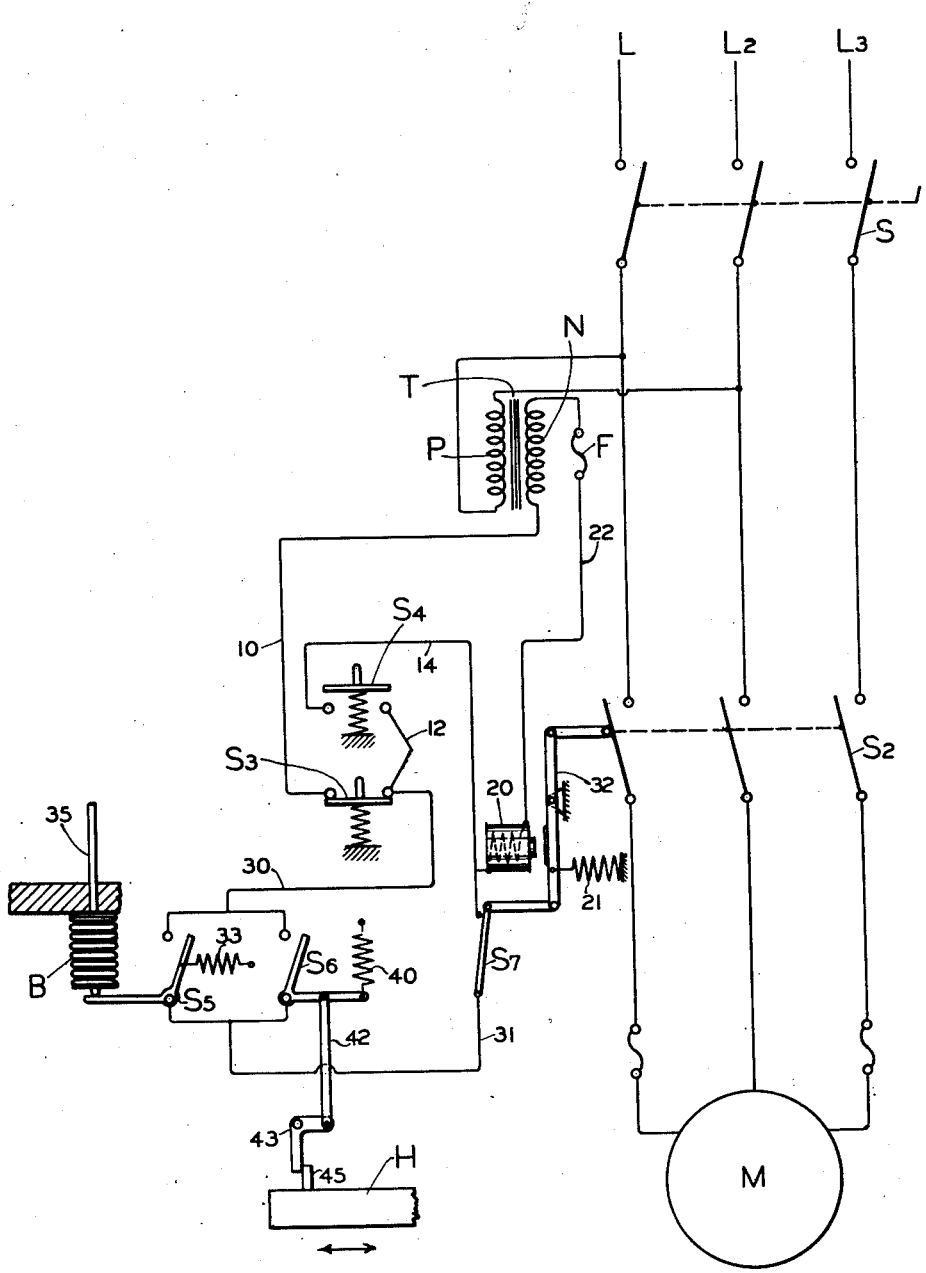

2,675,514

UNITED STATES PATENT OFFICE 2,675,514

MECHANISM FOR STOPPING MACHINE TOOLS ON FAILURE OF LUBRICANT PRESSURE

Edwin R. Smith, Seneca Falls, N. Y., assignor to Seneca Falls Machine Company, Seneca Falls, N. Y., a corporation of Massachusetts Application November 2, 1950, Serial No. 193,673

1 Claim. (Cl. 318—452)

This invention relates to machine tools in which a continuous supply of liquid lubricant under pressure is required during machine operation.

Devices are known by which such a machine will be stopped on failure of lubricant pressure, but these known devices will stop the machine immediately on such failure of pressure and at any point in the cycle of machine operation. Machine stoppage thus frequently takes place with the tool in the work and with the machine operation incomplete.

Such machine operations are usually performed under heavy work pressure and stoppage of the machine during a cutting or machine operation frequently causes breakage of the operating tool, particularly if of the carbide type. On the other hand, it is found that little or no damage commonly results from completion of the cutting or other machine operation which is in process, even if the lubricant pressure has dropped or failed.

It is the general object of my invention to provide mechanism by which the operation of a machine tool will be interrupted on failure of lubricant pressure, but only after completion of the operation which is in process.

To the accomplishment of this object, I provide two control devices mounted in parallel, one of which is responsive to failure of lubricant pressure while the other responds to completion of the machine operation which is in process.

My invention further relates to arrangements and combinations of parts which will be hereinafter described and more particularly pointed out in the appended claim.

Reference is to be had to the accompanying drawing which is a diagrammatic view of preferred coacting devices or mechanism embodying my invention.

Referring to the drawing, a main motor M is supplied with current from line wires L, L2 and L3 through the usual disconnect switch S and the usual control switch S2.

The primary P of a control transformer T is connected to the wires L and L2 below the switch S. The secondary N of the transformer T is connected through a wire 10 to a normally-closed "stop" switch S3, which in turn is connected through a wire 12 to a normally-open "start" switch S4. The switch S4 is connected through a wire 14 to the electromagnet 20 which closes the control switch S2 against the tension of a spring 21.

The other lead of the magnet 20 is connected through a wire 22 and fuse F to the secondary N of the transformer T. Switches S5 and S6 are mounted in parallel and are connected by a wire 30 to the stop switch S3 and by a wire 31 to the control magnet 20 through a holding switch S7 which is linked to the lever 32 operated by the magnet 20.

The pressure switch S5 is opened by a spring 33 and is closed by a bellows-operator B which is connected to the lubricating system by a pipe 35. When the pressure of lubricant is normal, the pressure switch S5 is held closed.

The operation switch S6 is movable to closed position by a spring 40 and is connected by a link 42 to a bell-crank 43. A dog 45 engages the bell-crank 43 to open the operation switch S6 when the table or head H reaches its end of travel after a machine operation.

The switches S5 and S6, while in parallel with each other, are collectively in series with the stop switch S3 and are collectively in parallel with the start switch S4. The operation switch S6 is normally open when the machine is at rest but closes as soon as the table or head H starts to move.

The pressure switch S5 is closed whenever the lubricating pressure is normal. If the pressure drops, the switch S5 will open but the machine will continue to run until the switch S6 also opens at the end of travel and with the tool out of the work.

The operation of my invention will be readily understood from the foregoing description. To start the machine, the disconnect switch S is manually closed and the start switch S4 is then closed briefly. When the switch S4 is closed, the magnet 20 is energized to close the control switch S2 and also the holding switch S7.

As soon as the head or table H starts to move to the right, the switch S6 will be closed by the spring 40, thus completing a holding circuit through the switch S7 for the magnet 20.

If the lubricating pressure is normal, the switch S5 will be in closed position, thus providing a second and parallel holding circuit. If the pressure drops during the operation of the machine, the pressure switch S5 will open but the operation switch S6 will remain closed. The machine will thus continue to operate until the dog 45 engages the bell-crank 43 and opens the switch S6.

Both branches of the holding circuit through the wire 31 and switch S7 being then open, the magnet circuit is broken and the spring 21 thereupon opens the control switch S2.

It is assumed that the starting switch S4 is closed only momentarily to start the machine, and that the stop switch S3 remains normally closed.

The machine will thus be stopped when failure of pressure is indicated by the bellows operator B, and the pressure switch S5 opens, but only after the operation switch S6 is also opened on completion of the machine operation in process. The machine may be stopped at any time by manually depressing and opening the stop switch S3.

It will be understood that the mechanism shown in the drawing is diagrammatic only, and that the provision for opening the operation switch S6 is illustrative only, as any other suitable provision may be substituted of opening the operation switch after completion of any machine operation or sub-operation.

Having thus described my invention and the advantages thereof, I do not wish to be limited to the details herein disclosed, otherwise than as set forth in the claim, but what I claim is:

In a machine tool having a driving motor, an electric power circuit therefor and a main switch in said power circuit, in combination, a control circuit for said main switch, which circuit comprises parallel branch circuits, a circuit-opening device in one branch circuit which is in closed position during normal machine operation and which operates to open said one branch circuit on failure of predetermined lubricant pressure, and a second circuit-opening device in the second branch circuit, which second device is in closed position during the performance of a normal machine operation on a piece of work in said machine tool and which second device is operated by said machine tool on completion of said operation on said piece of work to open said second branch circuit, said two circuit-opening devices being effective jointly only to entirely open the control circuit for said main switch and to thereby stop said machine tool after failure of predetermined lubricant pressure and on completion of the machine tool operation then under way, and each device being entirely ineffective singly to open said circuit or to stop said machine tool.

References Cited in the file of this patent

UNITED STATES PATENTS

| Number | Name | Date |
|---|---|---|
| 2,461,076 | Neeson | Feb. 8, 1949 |